United States Patent
Ide et al.

(10) Patent No.: US 7,990,582 B2
(45) Date of Patent: *Aug. 2, 2011

(54) IMAGE READING APPARATUS AND IMAGE READING METHOD

(75) Inventors: Naoaki Ide, Shizuoka (JP); Yusuke Hashizume, Urayasu (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 245 days.

This patent is subject to a terminal disclaimer.

(21) Appl. No.: 12/335,340

(22) Filed: Dec. 15, 2008

(65) Prior Publication Data

US 2009/0097078 A1  Apr. 16, 2009

Related U.S. Application Data

(63) Continuation of application No. 10/788,350, filed on Mar. 1, 2004, now Pat. No. 7,471,426.

(30) Foreign Application Priority Data

Mar. 3, 2003 (JP) ................................ 2003-056324

(51) Int. Cl.
*H04N 1/04* (2006.01)
(52) U.S. Cl. ........ 358/474; 358/514; 358/505; 358/497; 382/275; 382/254; 399/367; 399/371
(58) Field of Classification Search .................. 358/473, 358/509, 475, 513–518, 505, 497, 486; 382/107, 382/169, 254; 399/367, 371, 351, 370
See application file for complete search history.

(56) References Cited

U.S. PATENT DOCUMENTS

| | | | | |
|---|---|---|---|---|
| 4,734,762 | A * | 3/1988 | Aoki et al. | 358/516 |
| 5,122,871 | A * | 6/1992 | Israeli et al. | 358/515 |
| 5,363,213 | A | 11/1994 | Coward et al. | |
| 5,734,758 | A | 3/1998 | Yamamoto et al. | |
| 5,970,181 | A * | 10/1999 | Ohtsu | 382/274 |
| 6,411,363 | B1 * | 6/2002 | Kamada et al. | 355/52 |
| 6,473,204 | B1 | 10/2002 | Suzuki et al. | |
| 6,587,224 | B1 | 7/2003 | Nabeshima et al. | |
| 6,859,637 | B2 * | 2/2005 | Kawai | 399/367 |
| 6,958,835 | B2 | 10/2005 | Sakakibara et al. | |
| 7,126,725 | B2 * | 10/2006 | Okutomi et al. | 358/474 |
| 7,289,249 | B2 * | 10/2007 | Sone | 358/461 |
| 7,317,828 | B2 | 1/2008 | Suzuki et al. | |
| 7,336,446 | B2 * | 2/2008 | Kanagawa et al. | 360/245.9 |

(Continued)

FOREIGN PATENT DOCUMENTS

JP  2000-295486 A  10/2000

(Continued)

OTHER PUBLICATIONS

U.S. Appl. No. 10/370,732, filed Feb. 24, 2003, Hashizume.

(Continued)

*Primary Examiner* — Negussie Worku
(74) *Attorney, Agent, or Firm* — Foley & Lardner LLP

(57) ABSTRACT

An image reading apparatus having a color line sensor and a monochromatic line sensor starts to read on the basis of the color reading start position when reading the image of a document in color and starts to read on the basis of the monochromatic reading start position when reading the image of a document in monochrome.

22 Claims, 10 Drawing Sheets

U.S. PATENT DOCUMENTS

| | | | |
|---|---|---|---|
| 7,336,846 B2* | 2/2008 | Misaka et al. | 382/254 |
| 7,433,088 B2* | 10/2008 | Soeda | 358/474 |
| 7,502,147 B2* | 3/2009 | Suzuki et al. | 358/504 |
| 7,515,312 B2* | 4/2009 | Murakami et al. | 358/461 |
| 7,675,657 B2* | 3/2010 | Ishiguro et al. | 358/514 |
| 7,729,023 B2* | 6/2010 | Morikawa | 358/521 |
| 2003/0063332 A1 | 4/2003 | Sato | |
| 2003/0072497 A1* | 4/2003 | Hiromatsu | 382/274 |
| 2007/0121169 A1* | 5/2007 | Inukai | 358/3.26 |
| 2008/0024842 A1* | 1/2008 | Tsukahara et al. | 358/505 |

FOREIGN PATENT DOCUMENTS

JP    2002-325176 A    11/2002

OTHER PUBLICATIONS

U.S. Appl. No. 10/787,077, filed Feb. 27, 2004, Hashizume et al.

U.S. Appl. No. 10/800,666, filed Mar. 16, 2004, Hashizume.

* cited by examiner

IMAGE READING APPARATUS AND IMAGE READING METHOD

CROSS-REFERENCE TO RELATED APPLICATIONS

The present application is a Continuation of U.S. application Ser. No. 10/788,350, filed Mar. 1, 2004, which is based upon and claims the benefit of priority from prior Japanese Patent Application No. 2003-056324, filed Mar. 3, 2003, the entire contents of which are incorporated herein by reference.

BACKGROUND OF THE INVENTION

1. Field of the Invention

This invention relates to an image reading apparatus and an image reading method which scan the reading face of a document optically and convert the scanned data into color image data or monochromatic image data.

2. Description of the Related Art

In a conventional image reading apparatus (or a color image reading apparatus) which reads images on a document in color, the entire document is scanned optically by moving the carriage and the color images are read by the color CCD sensor. The conventional color image reading apparatus uses a 3-line CCD sensor as a color CCD sensor. The 3-line CCD sensor is composed of the following three line CCD sensors: a first line CCD sensor that outputs a red component (R signal), a second line CCD sensor that outputs a green component (G signal), and a third line CCD sensor that outputs a blue component (B signal). In an image reading apparatus with three line CCD sensors, when a monochromatic image is read, a monochromatic image is created on the basis of the signals (RGB signals) outputted from the three line sensors.

In the conventional image reading apparatus, the output of each of the three line CCD sensors constituting the 3-line CCD sensor is not always uniform. This nonuniformity results from variations in the sensitivity of a pixel unit in each line CCD sensor and a decrease in the amount of light around the lens caused by the light distribution characteristic of the exposure lamp that illuminates the document and the characteristic of the lens. Thus, in the conventional image reading apparatus, a reference plate (shading correction plate) acting as a white reference is read by the 3-line CCD sensor. On the basis of the result of the reading, the output signal from the 3-line CCD sensor is corrected (or the shading is corrected).

Therefore, in the image reading apparatus with the 3-line CCD sensor, the white reference plate is always read in the same reading position. This is because the image reading apparatus with the 3-line CCD sensor reads not only color images but also monochromatic images with the three line CCD sensors. Consequently, the conventional image reading apparatus with the three-line CCD sensor reads the shading correction plate in the fixed reading position, regardless of whether the image of the document is read in color or in monochrome, and makes a shading correction of the output signal from each line sensor.

BRIEF SUMMARY OF THE INVENTION

It is an object of the present invention to provide an image reading apparatus and an image reading method which are capable of not only reading color images and monochromatic images efficiently but also making a shading correction effective and the image reading apparatus more compact and stable by making the width of the reference plate smaller.

According to an aspect of the present invention, there is provided an image reading apparatus which reads images on the reading face of a document in color or in monochrome, the image reading apparatus comprising: a line sensor which includes a color line sensor for reading a color image and a monochromatic line sensor for reading a monochromatic image different from the color line sensor; a scanning section on which an optical system for directing light from the reading face of the document to the line sensor is provided; a driving mechanism which moves the scanning section in a feed direction with respect to the reading face of the document; a reference plate which is provided in front of the leading edge of the reading face of the document in the feed direction in which the scanning section is moved by the driving mechanism; and a control section which, when the reading face of the document is read in color, starts to read the reference plate with the color line sensor at the time that the scanning section moved in the feed direction by the driving mechanism reaches a color reading start position for the reference plate, thereby reading the reference plate with the color line sensor, and which, when the reading face of the document is read in monochrome, starts to read the reference plate with the monochromatic line sensor at the time that the scanning section moved in the feed direction by the driving mechanism reaches a monochromatic reading start position for the reference plate, thereby reading the reference plate with the monochromatic line sensor.

According to another aspect of the present invention, there is provide an image reading method used in an image reading apparatus which comprises a line sensor which includes a color line sensor for reading a color image and a monochromatic line sensor for reading a monochromatic image different from the color line sensor, a scanning section on which an optical system for directing light from the reading face of the document to the line sensor is provided, a driving mechanism which moves the scanning section in a feed direction with respect to the reading face of the document, and a reference plate which is provided in front of the leading edge of the reading face of the document in the feed direction in which the scanning section is moved by the driving mechanism, the image reading method comprising: when the reading face of the document is read in color, starting to read the reference plate with the color line sensor at the time that the scanning section moved in the feed direction by the driving mechanism reaches a color reading start position for the reference plate and thereby reading the reference plate with the color line sensor; and when the reading face of the document is read in monochrome, starting to read the reference plate with the monochromatic line sensor at the time that the scanning section moved in the feed direction by the driving mechanism reaches a monochromatic reading start position for the reference plate and thereby reading the reference plate with the monochromatic line sensor.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate an embodiment of the invention, and together with the general descrip

DETAILED DESCRIPTION OF THE INVENTION

Hereinafter, referring to the accompanying drawings, an embodiment of the present invention will be explained.

Figure 1:
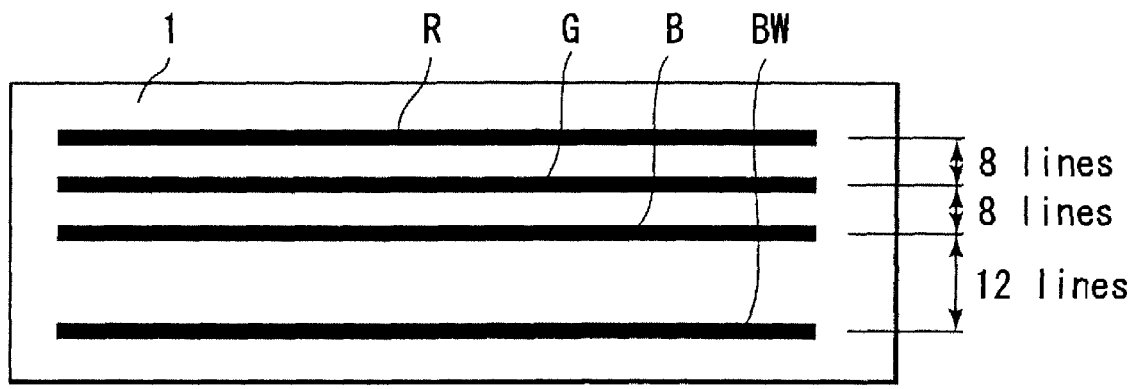
- FIG. 1 shows the configuration of a 4-line CCD sensor provided in an image reading apparatus according to an embodiment of the present invention.

FIG. 1 shows a configuration diagram of a 4-line CCD sensor 1 provided in an image reading apparatus according to an embodiment of the present invention.

As shown in FIG. 1, the 4-line CCD sensor 1 comprises a red line sensor R that converts the red component of the incident light photoelectrically into an R signal representing the intensity of red, a green line sensor G that converts the green component of the incident light photoelectrically into a G signal representing the intensity of green, a blue line sensor B that converts the blue component of the incident light photoelectrically into a B signal representing the intensity of blue, and a black-and-white line sensor BW that converts the black and white components of the incident light photoelectrically into a BW signal representing the intensity of black and white.

In the 4-line CCD sensor 1, the red line sensor R, green line sensor G, and blue line sensor B constitute a color line sensor that reads images in color. The black-and-white line sensor BW constitutes a monochromatic line sensor that reads images in monochrome.

The red line sensor R is composed of a CCD line sensor with a red filter. Therefore, the red line sensor R can take in only the red component of the incident light and output an R signal.

The green line sensor G is composed of a CCD line sensor with a green filter. Therefore, the green line sensor G can take in only the green component of the incident light and output and a G signal.

The blue line sensor B is composed of a CCD line sensor with a blue filter. Therefore, the blue line sensor B can take in only the blue component of the incident light and output and a B signal.

In the 4-line CCD sensor 1, the line sensors R, G, B, BW are arranged in parallel at specific intervals. In an example of FIG. 1, the line sensors are arranged in this order: R, G, B, BW. Each of the spacing between the red line sensor R and the green line sensor G and the spacing between the green line sensor G and the blue line sensor B is equivalent to eight lines. The spacing between the blue line sensor B and the black-and-white line sensor BW is equivalent to 12 lines.

Specifically, as the color line sensors, the red line sensor R, green line sensor G, and blue line sensor B are arranged in parallel at intervals of eight lines. As the monochromatic line sensor, the black-and-white sensor BW is arranged in parallel with the blue line sensor B acting as a color line sensor, spaced 12 lines apart. One line contains, for example, 7450 pixels. One pixel has a size of 4.7 μm×4.7 μm.

Next, the configuration of the image reading apparatus provided with the 4-line CCD sensor will be explained.

Figure 2:
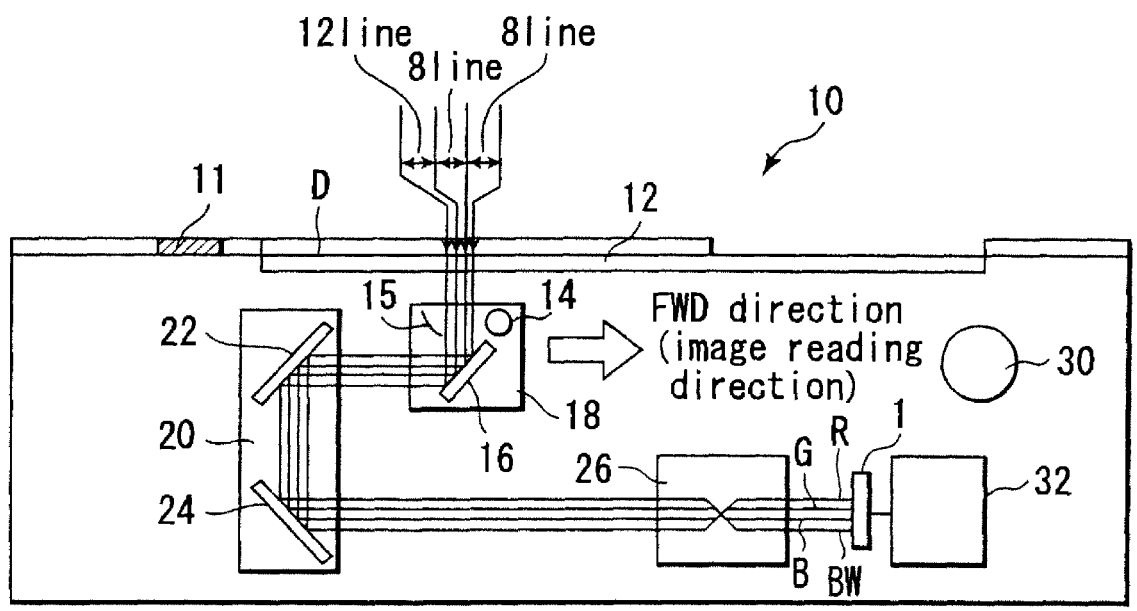
FIG. 2 schematically shows the configuration of the image reading apparatus according to the embodiment.

FIG. 2 shows a configuration of the image reading apparatus according to the embodiment of the present invention.

As shown in FIG. 2, the image reading apparatus 10 comprises a shading correction plate 11, a document table 12, an exposure lamp 14, a reflector 15, a first mirror 16, a first carriage 18, a second carriage 20, a second mirror 22, a third mirror 24, an image forming lens 26, a driving motor 30, and a control unit (control board) 32.

The shading correction plate 11 is a reference plate for making a shading correction of the output signal of each line sensor of the 4-line CCD sensor on a pixel basis. The shading correction plate 11 shows a white reference. Specially, in the shading correction, the output data in pixels from each line sensor of the 4-line CCD sensor 1 is corrected on the basis of the data read from the shading correction plate 11.

The width in the feed direction of the shading correction plate 11 is determined by the spacing between the individual line sensors, the number of reads (the number of reading lines), the reading magnification (the travel speed of the first carriage), and others. In the configuration of FIG. 2, the shading correction plate 11 is provided just in front of the document table 12 in the direction in which an image is read with the first carriage 18 (or in the feed direction).

The shading correction plate 11 has to be read before the document image is read. It also has to be read in a state where the first carriage 18 is moving stably. For this reason, the shading correction plate 11 has to be provided in front of the document image reading area (or in front of the leading edge of the document) and behind the position where the travel speed of the first carriage 18 started from a specific standby position becomes stable.

Since the above restriction is put on the installation location of the shading correction plate 11 in the image reading apparatus 10, it is desirable that the width in the feed direction of the shading correction plate 11 should be as narrow as possible. In addition, it is desirable that the shading correction plate 11 should be read efficiently.

The document table 12 is composed of a colorless, transparent member, such as glass, which permits light to pass through. The document table 12 is provided with a document cover (not shown). The document on the document table 12 is pressed against the glass surface of the document table 12 by the document cover (not shown).

The exposure lamp 14 functions as a light source to eliminate the shading correction plate 11 and the document D put on the document table 12. The reflector 15 reflects a part of the light from the exposure lamp 14 and illuminates the document D. The first mirror 16 deflects the reflected light from the shading correction plate 11 or the document D in a specific direction.

The first carriage 18 is provided with the exposure lamp 14, reflector 15, first mirror 16, and others. The first carriage 18 is provided under the document table 12 so as to be movable in parallel with the document table 12. The first carriage 18 is moved back and forth under the document table 12 by a driving motor 30 connected to the carriage 18 via a toothed belt (not shown) and others. The driving motor 30 is composed of a stepping motor driven by a driving pulse signal or the like from the control unit 32.

Furthermore, under the document table 12, the second carriage 20 is provided so as to be movable in parallel with the document table 12. On the second carriage 20, the second mirror 22 and third mirror 24 which deflect sequentially the reflected light from the document D deflected by the first mirror 16 are so provided that they cross each other at right angles. The driving force of the driving motor 30 is imparted to the second carriage 20 by the toothed belt and others which drive the first carriage 18, with the result that the second carriage 20 is moved according to the movement of the first carriage 18. The second carriage 20 is moved in parallel with the document table 12 at a speed half of the speed of the first carriage 18.

In addition, under the document table 12, there are provided the image forming lens 26 which converges the reflected light from the third mirror 24 mounted on the second carriage 20 and the 4-line CCD sensor 1 which receives the reflected light converged by the image forming lens 26 and converts it photo-electrically. The image forming lens 26 is provided in a movable manner via a driving mechanism (not shown) in a plane that includes the optical axis of the light deflected by the third mirror 24. The image forming lens 26 itself moves, thereby forming an image from the reflected light at a desired magnification. Then, in the 4-line CCD sensor 1, the individual line sensors R, G, B, BW convert photoelectrically the light coming in via the image forming lens 26 pixel by pixel and output the resulting signals to the control unit 32.

Next, the configuration of the control system of the image reading apparatus 10 will be explained.

Figure 3:
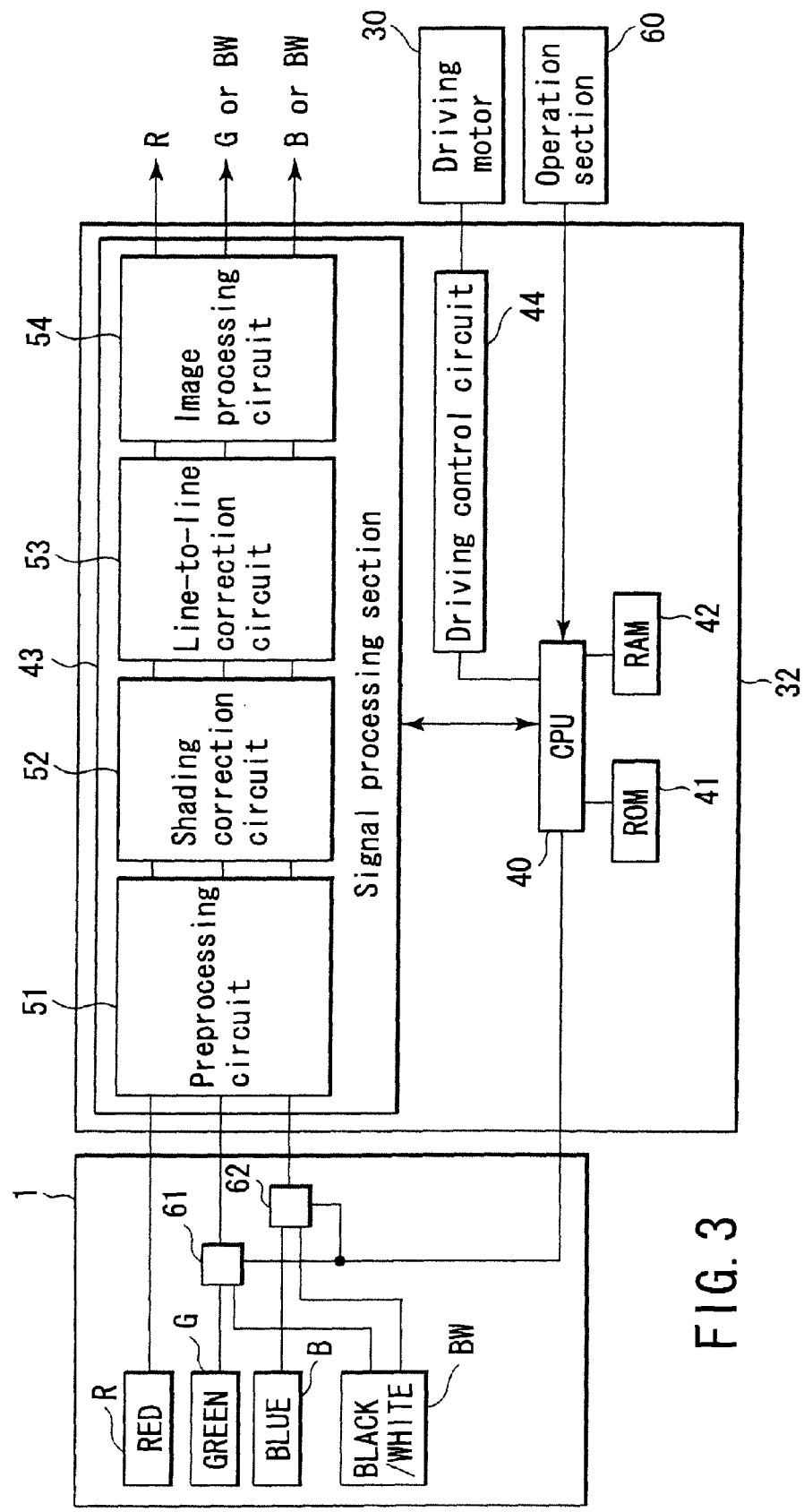
FIG. 3 is a block diagram of the control system of the image reading apparatus.

FIG. 3 is a schematic block diagram of the control system of the image reading apparatus 10.

On the control board 32 of the image reading apparatus 10, there are provided a CPU 40, a ROM 41, a RAM 42, a signal processing section 43, and a driving control section 44. The CPU 40 controls the entire image reading apparatus 40. The ROM 41 is a memory in which control programs for performing the image reading operation and others are stored. The RAM 42 is a memory which stores data temporarily. The signal processing section 43 processes the signal from the 4-line CCD sensor 1 and outputs the resulting signal to the outside world. The driving control section 44 has a motor driver which drives the driving motor 30.

The signal processing section 43 has a pre-processing circuit 51, a shading correction circuit 52, a line-to-line correction circuit 53, and an image processing circuit 54.

The preprocessing circuit 51 carries out processes, including an A/D conversion process of converting the analog signal from the 4-line CCD sensor into a digital signal.

The shading correction circuit 52 makes correction in pixels on the basis of the result of the reading of the shading correction plate 11 by the 4-line CCD sensor 1. Specifically, the shading correction circuit 52 creates correction data for each pixel on the basis of the result of the reading of the shading correction plate 11 as a white reference plate by the 4-line CCD sensor 1. Furthermore, the shading correction circuit 52 corrects the output signals from the individual line sensors R, G, B, BW of the 4-line CCD sensor 1 according to the correction data created on the basis of the result of the reading of the shading correction plate 11.

For example, on the basis of the black reference data previously read by the line sensors R, G, B, BW (the output signals from the respective line sensors when the exposure lamp 14 is off) and the white reference data read from the shading correction plate 11 by the line sensors R, G, B, BW (the output signals from the respective line sensors when the shading correction plate 11 as a white reference plate is read) the shading correction circuit 52 corrects the output signals from the line sensors R, G, B, BW in pixels in reading the document image by using the following equation:

$$I = K \times (S-B)/(W-B)$$

where I is the signal after correction, K is a coefficient, S is the output signal before correction (the output signal from the line sensor), B is the black reference data, and W is the white reference data.

The line-to-line correction circuit 53 aligns the data from the red line sensor R, the data from the green line sensor G, and the data from the blue line sensor B with one another. Specifically, the red, green, and blue line sensors are so arranged that their lines are shifted several pixels from one another. For this reason, to create a color image, the phases of the data from the line sensors R, G, and B have to be aligned with one another according to the movement speed in the feed direction.

For example, in the configuration of FIG. 1, the red, green, and blue line sensors R, G, and B as color line sensors are arranged in this order: R, G, B, or in the order of scanning. The red line sensor R and the green line sensor G are so arranged that they are spaced eight pixels apart. The green line sensor G and the blue line sensor B are so arranged that they are spaced eight pixels apart. In this case, if the magnification ratio is 25% to 400%, a positional correction of 2 to 32 lines has to be made between R and G and between G and B in the data from the line sensors R, G, B.

For example, when the blue line sensor B is used as a reference, the line-to-line correction circuit 53 makes a positional adjustment of 4 to 64 lines to the data from the red line sensor R and a positional adjustment of 2 to 32 to the data from the green line sensor G. Making such positional adjustments, the line-to-line correction circuit 53 superimposes the data of the R signal, G signal, and B signal and creates a color image with no off-shade part.

The image processing circuit 54 carries out an image process and outputs the resulting image to the outside world. For example, when outputting a color image, the image processing circuit 54 makes a color correction of the data subjected to the line-to-line correction and outputs the resulting data to the outside world. When outputting a monochromatic image, the image processing circuit 54 effects the filtering of the data of the BW signal passed through the line-to-line correction circuit and outputs the resulting data to the outside world.

To the CPU 40, an operation section 60 is connected. The user's operation instruction is inputted to the operation section 60. The operation section 60 is provided with, for example, a setting key for setting a read magnification, an image select key for selecting either color or monochrome, a specify key for specifying the start of reading. For example, when the user specifies the reading mode for the document from the operation section 60 and presses the key for specifying the start of reading, the CPU 40 starts to read the document image according to the specified reading mode.

Furthermore, to the CPU 40, a switching circuit 61 and a switching circuit 62 are connected. The switching circuit 61 is a circuit which switches between the G signal from the green line sensor G and the BW signal from the black-and-white line sensor BW among the signals supplied from the 4-line CCD sensor 1 to the signal processing section 43. The switching circuit 62 is a circuit which switches between the B signal from the blue sensor B and the BW signal from the black-and-white line sensor BW among the signals supplied from the 4-line CCD sensor 1 to the signal processing section 43.

Specifically, in the reading mode of reading images in color (color reading mode), the CPU 40 makes the G signal effective with the switching circuit 61 and the B signal effective with the switching circuit 62. In this case, the 4-line CCD sensor 1 supplies the R signal from the red line sensor R, the G signal from the green line sensor G, and the B signal from the blue line sensor B to the signal processing section 43. This enables the 4-line CCD sensor 1 to read a color image.

Furthermore, in the reading mode of reading images in monochrome (monochromatic reading mode), the CPU 40 makes not only the BW signal effective with the switching circuit 61 but also the BW signal effective with the switching circuit 62. In this case, the 4-line CCD sensor 1 supplies the BW signal from the black-and-white line sensor BW to the signal processing section 43. This enables the 4-line CCD sensor 1 to read a monochromatic image.

With the configuration of FIG. 3, when reading a monochromatic image, the 4-line CCD sensor 1 supplies the BW signals of the two channels to the signal processing section 43. In this case, one channel supplies the BW signal for an even number of lines and the other supplies the BW signals for an odd number of lines.

Next, the operation of the image reading apparatus 1 will be explained briefly.

Figure 4:
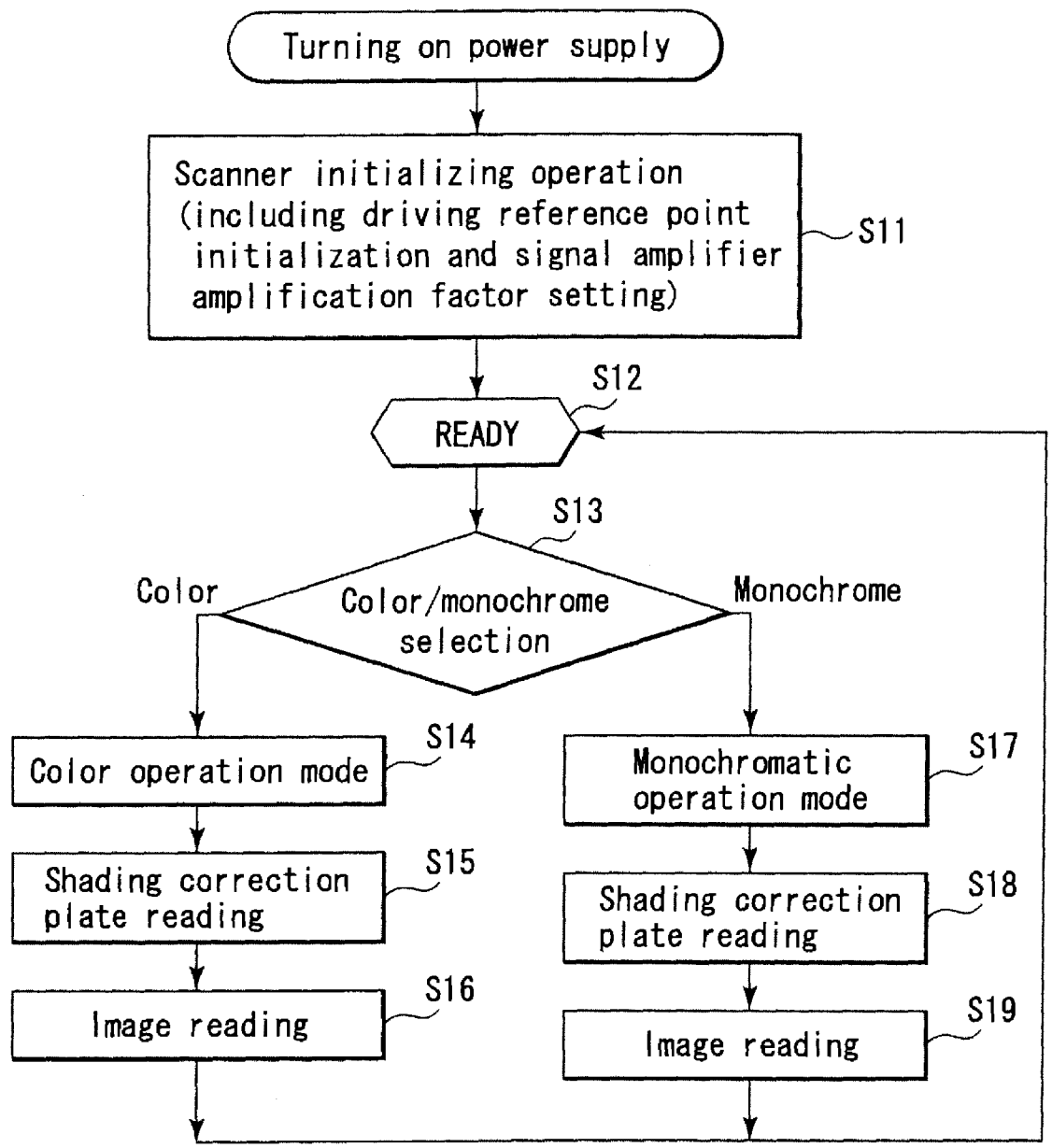
FIG. 4 is a flowchart to help explain the operation of the entire image reading apparatus roughly.

FIG. 4 is a flowchart to help explain the read operation of the image reading apparatus 10.

When the power key (not shown) is pressed, the CPU 40 executes an initialize operation (step S11). In the initialize operation, the CPU 40 carries out the initial operation of the entire image reading apparatus 10, including the initialization of the driving reference point and the setting of the amplification factor by the signal amplifying section.

After the initialize operation is completed, the CPU 40 brings the image reading apparatus 10 into the READY state of the image reading operation (step S12). In this state, the user specified the image reading mode from the operation section 60 and presses the start key for specifying the start of image reading. At this time, the user chooses whether the document image should be read in color (color reading mode) or in monochrome (monochromatic reading mode). After the user specifies the start of reading, the operation section 60 supplies not only a signal to request the start of document image reading but also information representing the document reading mode to the CPU 40.

Receiving the reading start request from the operation section 60, the CPU 40 chooses either the color reading mode or the monochromatic reading mode, on the basis of the information representing the reading mode from the operation section 60 (step S13).

When the color reading mode is chosen, the CPU 40 sets a color-reading-mode operation according to the reading mode specified by the user, such as a reading magnification (step S14). In the color reading mode operation setting, for example, the reading position of the shading correction plate 11 and the reading position of the document image are set for the three line sensors R, G, B.

After the color reading mode operation setting is completed, the CPU 40 starts to move the first carriage 18. Then, the first carriage 18 accelerates to the travel speed for reading set in the operation setting. At the reading speed, the first carriage 18 moves in the feed direction under the shading correction plate 11 and document table 12. When the first carriage 18 has arrived at under the shading correction plate 11, the CPU 40 reads the shading correction plate 11 with the three line sensors R, G, B acting as the color line sensors (step S15). The reading of the shading correction plate 11 by the color line sensors will be explained in detail later.

When the first carriage 18 passes under the shading correction plate 11 and arrives at the document image reading position, the CPU 40 starts to read the image of the document placed on the document table 12 by means of the three line sensors R, G, B acting as the color line sensors. Moreover, when the first carriage 18 has reached the reading end position of the document, the CPU 40 ends the reading of the document image (step S16).

After the document image has been read, the CPU 40 moves the first carriage 18 to a specific standby position. When the first carriage 18 has moved to the standby position, the CPU 40 returns control to step S12 and brings the image reading apparatus 10 into the READY state.

When the monochromatic reading mode is chosen in step S13, the CPU 40 sets a monochromatic-reading-mode operation according to the reading mode specified by the user, such as a reading magnification (step S17). In the monochromatic reading mode operation setting, for example, the reading position of the shading correction plate 11 and the reading position of the document image are set for the monochromatic line sensor (black-and-white line sensor) BW.

After the monochromatic reading mode operation setting is completed, the CPU 40 starts to move the first carriage 18. Then, the first carriage 18 accelerates to the travel speed for reading set in the operation setting. At the reading speed, the first carriage 18 moves in the feed direction under the shading correction plate 11 and document table 12. When the first carriage 18 has arrived at under the shading correction plate 11, the CPU 40 reads the shading correction plate 11 with the black-and-white line sensor BW acting as the monochromatic line sensor (step S18). The reading of the shading correction plate 11 by the monochromatic line sensor will be explained in detail later.

When the first carriage 18 passes under the shading correction plate 11 and arrives at the document image reading position, the CPU 40 starts to read the image of the document placed on the document table 12 by means of the black-and-white line sensor BW acting as the monochromatic line sensor. Moreover, when the first carriage 18 has reached the reading end position of the document, the CPU 40 ends the reading of the document image (step S19). After the document image has been read, the CPU 40 moves the first carriage 18 to a specific standby position. When the first carriage 18 has moved to the standby position, the CPU 40 returns control to step S12 and brings the image reading apparatus 10 into the READY state.

Next, the operation of reading the shading correction plate 11 will be explained.

In shading correction explained below, suppose each of the line sensors R, G, B, BW of the 4-line CCD sensor 1 reads 16 lines of data as shading correction data.

Figure 5:
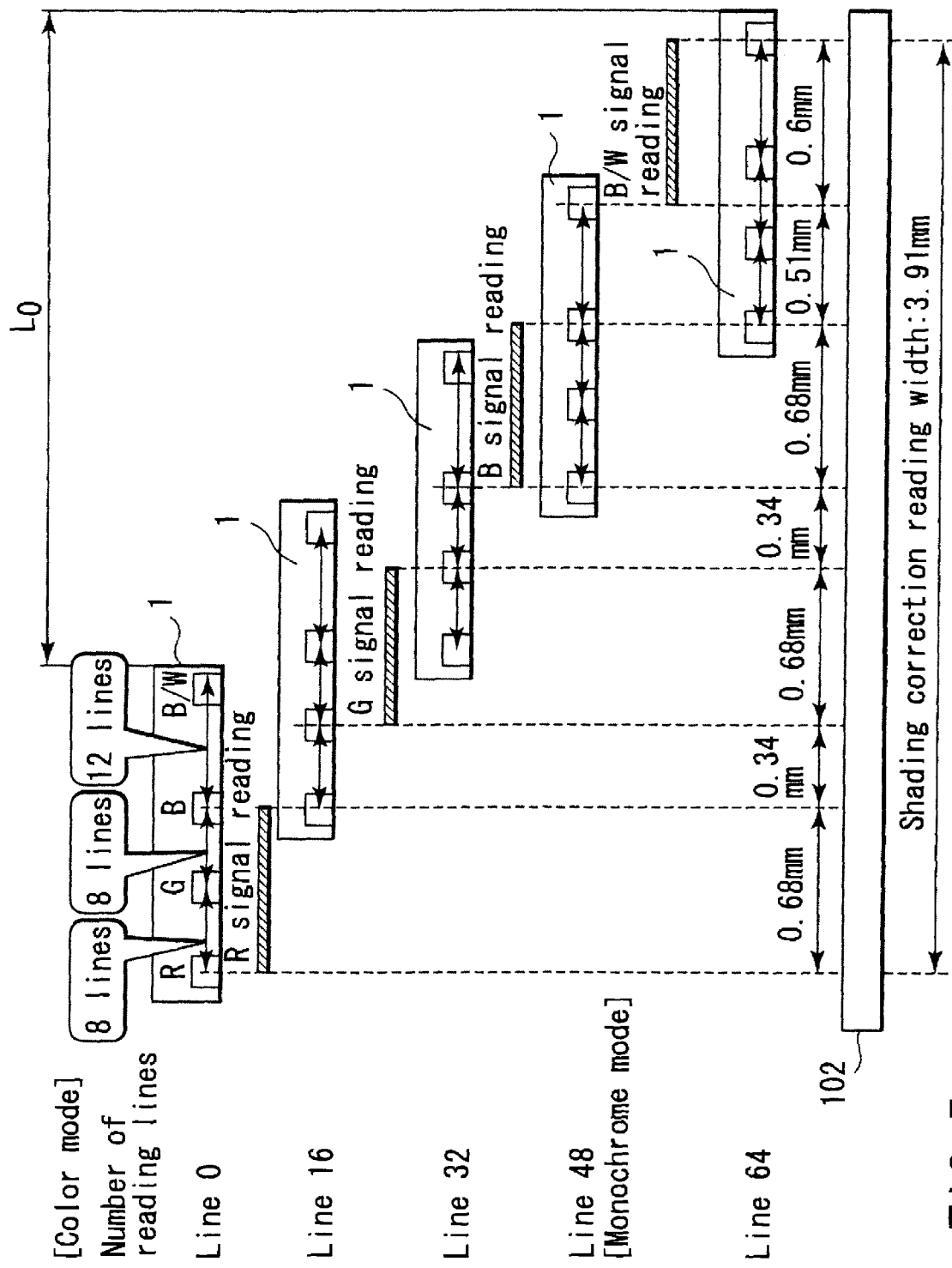
FIG. 5 is a diagram to help explain the operation in a case where the four line sensors read a shading correction plate in turn.

FIG. 5 is a diagram to help explain the reading positions in a case where the line sensors R, G, B, BW read the shading correction plate 11 in turn.

In the example of FIG. 5, it is assumed that the scanning positions of the line sensors R, G, B, BW are arranged in the order of BW, B, G, R in the direction in which the carriage 18 moves (or in the feed direction) and that the control unit 32 takes in the signals from the 4-line CCD sensor in this order: the R signal, G signal, B signal, BW signal.

Specifically, in the example of FIG. 5, first, the red line sensor R reads the shading correction plate 11 by 16 lines.

Then, the green line sensor G reads the shading correction plate 11 by 16 lines. Then, the blue line sensor B reads the shading correction plate 11 by 16 lines. Then, the black-and-white line sensor BW reads the shading correction plate 11 by 16 lines.

In this case, for example, if one line is 0.0425 mm in width (hereinafter, explanation will be given on the assumption that one line is 0.0425 mm wide), the width needed for the red line sensor R to read the shading correction plate 11 by 16 lines is 0.68 mm equivalent to 16 lines.

Furthermore, the width needed for the green line sensor G to red the shading correction plate 11 by 16 lines from the point where the read line sensor R read 16 lines is the sum of 0.34 mm equivalent to the spacing of 8 lines between the red line sensor R and the green line sensor G and 0.68 mm equivalent to 16 lines (the number of reading lines).

In addition, the width needed for the blue line sensor B to read the shading correction plate 11 by 16 lines from the point where the green line sensor G read 16 lines is the sum of 0.34 mm equivalent to the spacing of 8 lines between the green line sensor G and the blue line sensor B and 0.68 mm equivalent to 16 lines (the number of reading lines).

Moreover, the width needed for the black-and-white line sensor BW to read the shading correction plate 11 by 16 lines from the point where the blue line sensor B read 16 lines is the sum of 0.51 mm equivalent to the spacing of 12 lines between the blue line sensor B and the black-and-white line sensor BW and 0.68 mm equivalent to 16 lines (the number of reading lines).

Therefore, in the example of FIG. 5, the width in the feed direction of the shading correction plate 11 has to be equal to at least the total (3.91 mm equivalent to 92 lines) of the reading widths (equivalent to 16×4 lines) of the four line sensors R, G, B, BW and the total spacing between the four line sensors (equivalent to 8×2+12 lines). In FIG. 5, during the time from when the reading of the shading correction plate 11 is started until the reading is completed, the first carriage 18 requires a travel distance L0 of 2.72 mm equivalent to 64 (16×4) lines.

Hereinafter, a first to a third reading method for the shading correction method 11 will be explained.

The first to third reading methods can be applied to the image reading apparatus 10 where the scanning positions of the line sensors R, G, B, BW are arranged in the order of R, G, B, BW in the direction in which the first carriage 18 moves (or in the feed direction).

First, the first reading method for the shading correction plate 11 will be explained.

Figure 6:
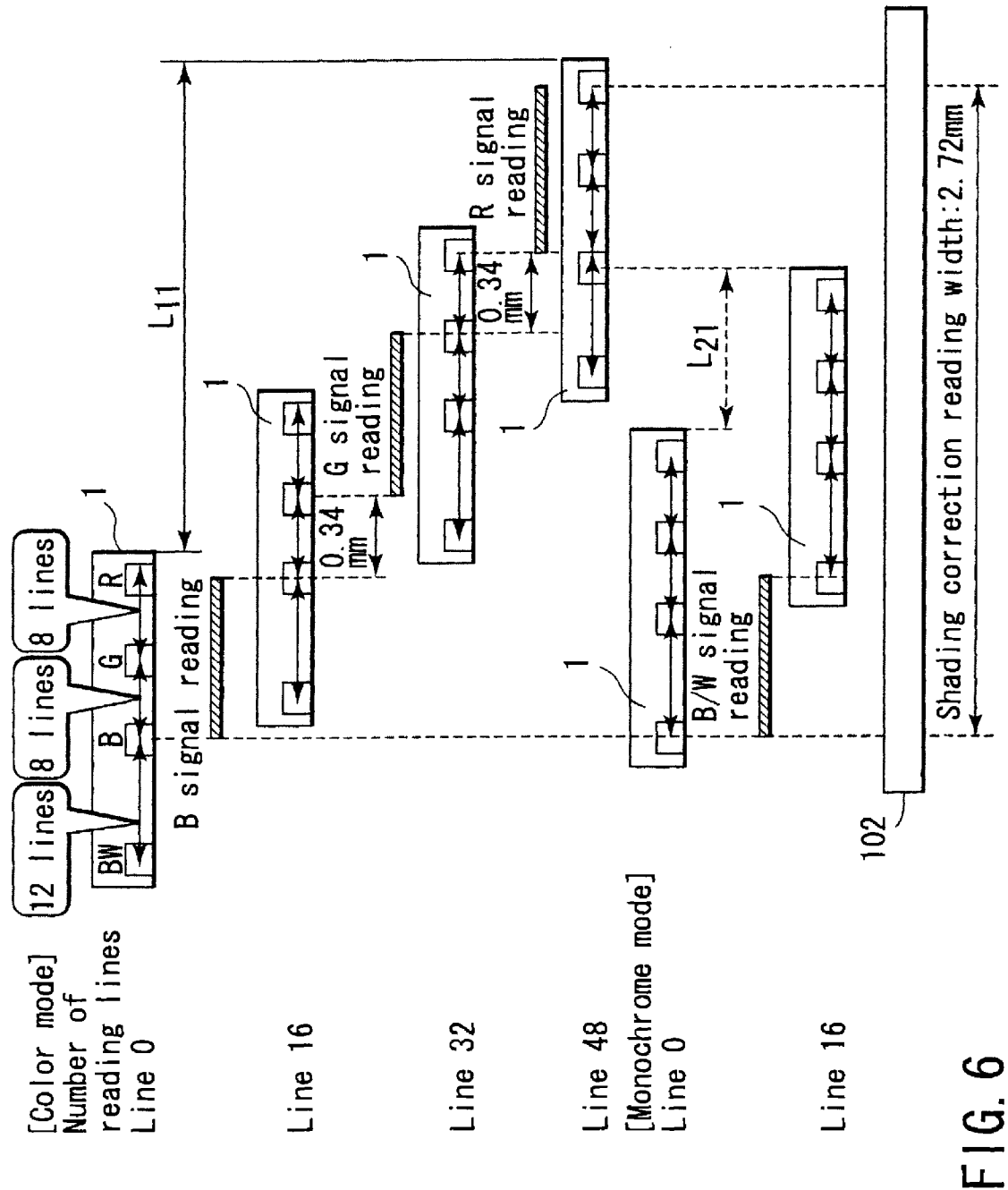
FIG. 6 is a diagram to help explain a shading correction plate reading operation in a first reading method.

FIG. 6 is a diagram to help explain the first reading method for the shading correction plate 11. In the example of FIG. 6, the scanning positions of the line sensors R, G, B, BW are arranged in the order of R, G, B, BW in the direction in which the first carriage 18 moves (or in the feed direction). In FIG. 6, suppose, in the color reading mode, the control unit 32 reads the signals from the three line sensors R, G, B in this order: the B signal, the G signal, and the R signal.

In FIG. 6, in the color reading mode, with the scanning position of the blue line sensor B as the reading start position (the trailing edge in the feed direction of the shading correction plate 11), the blue line sensor B first reads the shading correction plate 11 by 16 lines. Then, the green line sensor G reads the shading correction plate 11 by 16 lines. Thereafter, the red line sensor R reads the shading correction plate 11 by 16 lines.

Specifically, in the color reading mode, the width in the feed direction of the shading correction plate 11 is equal to the total (2.72 mm) of the width (0.68 mm) needed for the blue line sensor B to read 16 lines, the spacing of 8 lines (0.34 mm) between the blue line sensor B and the green line sensor G, the width (0.68 mm) needed for the green line sensor G to read 16 lines, the spacing of 8 lines (0.34 mm) between the green line sensor G and the red line sensor R, and the width (0.68 mm) needed for the red line sensor R to read 16 lines. In addition, when the shading correction plate 11 is read in the color reading mode, the travel distance L11 of the first carriage 18 is equivalent to 48 lines (16×3 lines).

In the monochromatic reading mode, with the scanning position of the black-and-white line sensor BW as the reading start position (the trailing edge in the feed direction of the shading correction plate 11), the black-and-white line sensor BW reads the shading correction plate 11 by 16 lines. Specifically, in the monochromatic reading mode, the width in the feed direction needed for the black-and-white line sensor BW to read the shading correction plate 11 by 16 lines is 0.68 mm equivalent to 16 lines (the number of reading lines). In addition, when the shading correction plate 11 is read in the monochromatic reading mode, the travel distance L21 of the first carriage 18 is equivalent to 16 lines.

As described above, in the first reading method, the width in the feed direction of the shading correction plate 11 has to be equal to the total (equivalent to 64 lines) of the reading widths (equivalent to 16×3 lines) of at least the three line sensors R, G, and B and the total spacing (equivalent to 8×2 lines) between the three line sensors in the color reading mode. In the monochromatic reading mode, the width has to be the reading width (equivalent to 16 lines) of at least the black-and-white line sensor BW.

Furthermore, in the first embodiment, the reading start position of the shading correction plate 11 in the monochromatic reading mode and the reading start position of the shading correction plate 11 in the color reading mode are set separately.

Therefore, in the first reading method of FIG. 6, the shading correction plate 11 has only to have a width of 64 lines in the feed direction. Specifically, as compared with the reading method of FIG. 5, in the first method, the width in the feed direction of the shading correction plate 11 can be decreased by the total of the spacing (equivalent to 12 lines) between the color line sensors (three line sensors R, G, B) and the monochromatic line sensor (black-and-white line sensor BW) and the reading width (equivalent to 16 lines) of the black-and-white line sensor BW. In addition, the travel distance of the first carriage in reading the shading correction plate can be decreased by the travel distance (equivalent to 16 lines) needed to read the black-and-white line sensor BW. This is the effect obtained because the reading position (the reading start position) of the shading correction plate in the color reading mode and the reading position (the reading start position) of the shading correction plate in the monochromatic reading mode have been set in separate positions.

Next, the second reading method for the shading correction plate 11 will be explained.

Figure 7:
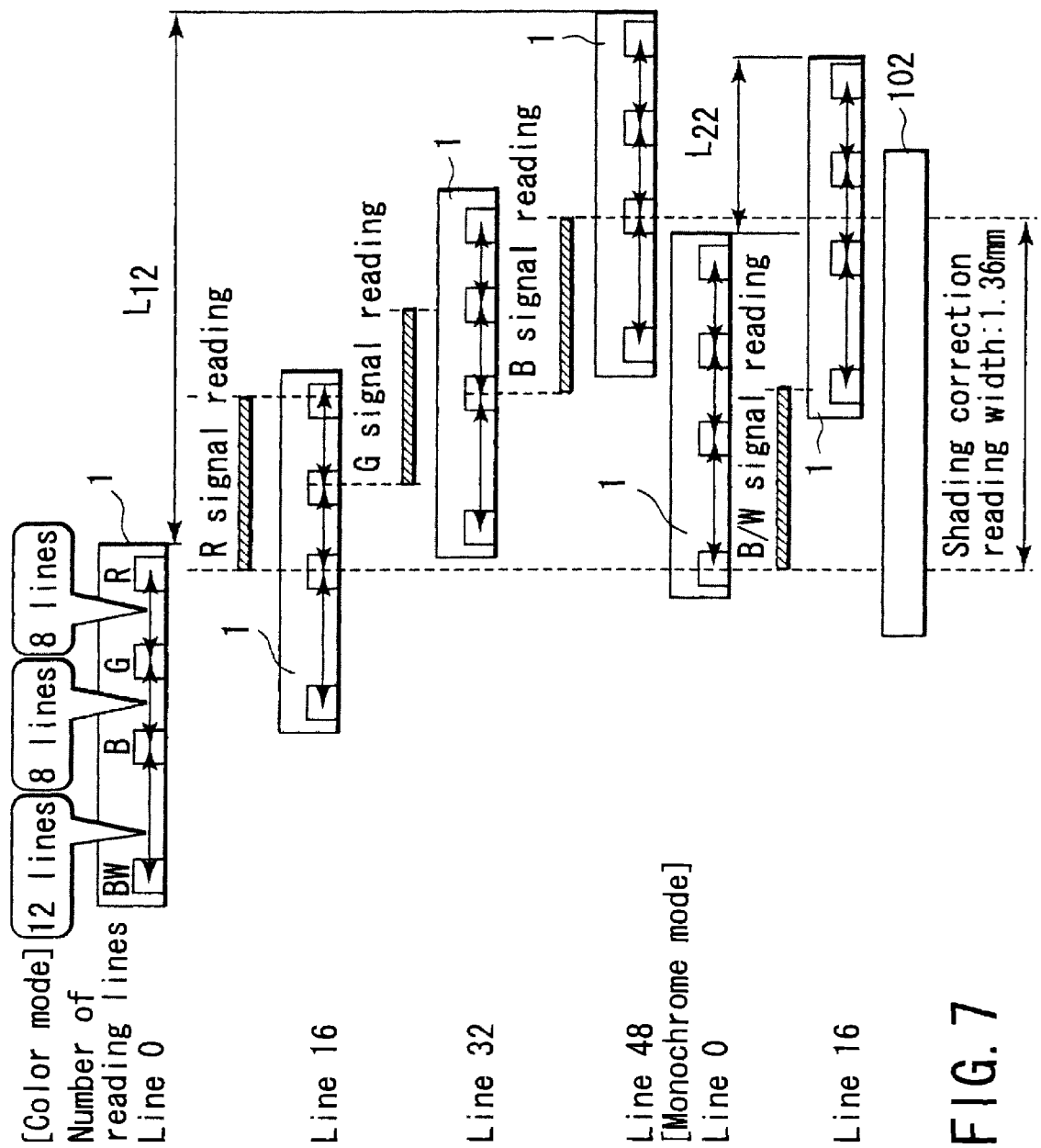
FIG. 7 is a diagram to help explain a shading correction plate reading operation in a second reading method.

FIG. 7 is a diagram to help explain the second reading method for the shading correction plate 11. In the example of FIG. 7, the scanning positions of the line sensors R, G, B, BW are arranged in the order of R, G, B, BW in the direction in which the first carriage 18 moves (or in the feed direction). In FIG. 7, suppose, in the color reading mode, the control unit 32 reads the signals from the three line sensors R, G, B in this order: the R signal, the G signal, and the B signal.

In FIG. 7, in the color reading mode, with the scanning position of the red line sensor R as the reading start position (the trailing edge in the feed direction of the shading correction plate 11), the red line sensor R first reads the shading correction plate 11 by 16 lines. Then, the green line sensor G reads the shading correction plate 11 by 16 lines. Thereafter, the blue line sensor B reads the shading correction plate 11 by 16 lines.

Specifically, in the color reading mode, the width in the feed direction of the shading correction plate 11 is equal to the total (1.36 mm) of the width (0.38 mm) obtained by subtracting the spacing of 8 lines (0.34 mm) between the red line sensor R and the green line sensor G from the width (0.68 mm) needed for the red line sensor R to read 16 lines, the width (0.38 mm) obtained by subtracting the spacing of 8 lines (0.34 mm) between the green line sensor G and the blue line sensor B from the width (0.68 mm) needed for the green line sensor G to read 16 lines, and the width (0.68 mm) needed for the blue line sensor B to read 16 lines. In addition, when the shading correction plate 11 is read in the color reading mode, the travel distance L12 of the first carriage 18 is equivalent to 48 lines (16×3 lines) as is the travel distance L11 in the first reading method.

In the monochromatic reading mode, with the scanning position of the black-and-white line sensor BW as the reading start position (the trailing edge in the feed direction of the shading correction plate 11), the black-and-white line sensor BW reads the shading correction plate 11 by 16 lines. Specifically, in the monochromatic reading mode, the width in the feed direction needed for the black-and-white line sensor BW to read the shading correction plate 11 by 16 lines is 0.68 mm equivalent to 16 lines (the number of reading lines). In addition, when the shading correction plate 11 is read in the monochromatic reading mode, the travel distance L22 of the first carriage 18 is equivalent to 16 lines as is the travel distance L21 in the first reading method.

As described above, in the second embodiment, the reading start position of the shading correction plate 11 in the color reading mode and the reading start position of the shading correction plate 11 in the monochromatic reading mode are set separately. The width in the feed direction of the shading correction plate 11 has to be equal to the value (equivalent to 32 lines) obtained by subtracting the total spacing between the three line sensors (equivalent to 8×2 lines) from the reading widths of at least the three line sensors R, G, and B (equivalent to 16×3 lines) in the color reading mode. In the monochromatic reading mode, the width has to be the reading width (equivalent to 16 lines) of at least the black-and-white line sensor BW.

Therefore, in the second reading method of FIG. 7, the shading correction plate has only to have a width of 32 lines in the feed direction. Specifically, in the second reading method of FIG. 7, the travel distance of the first carriage in reading the shading correction plate is the same as in the first reading method of FIG. 6 and the width in the feed direction of the shading correction plate is decreased by twice the total spacing between the three line sensors.

Next, the third reading method for the shading correction plate 11 will be explained.

Figure 8:
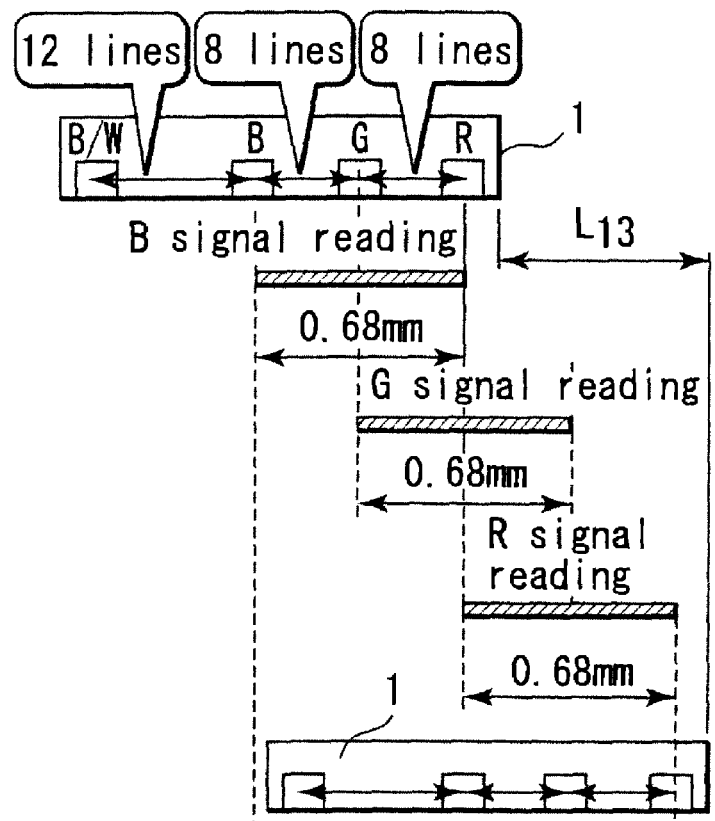
FIG. 8 is a diagram to help explain a shading correction plate reading operation in a third reading method.
Figure 8:
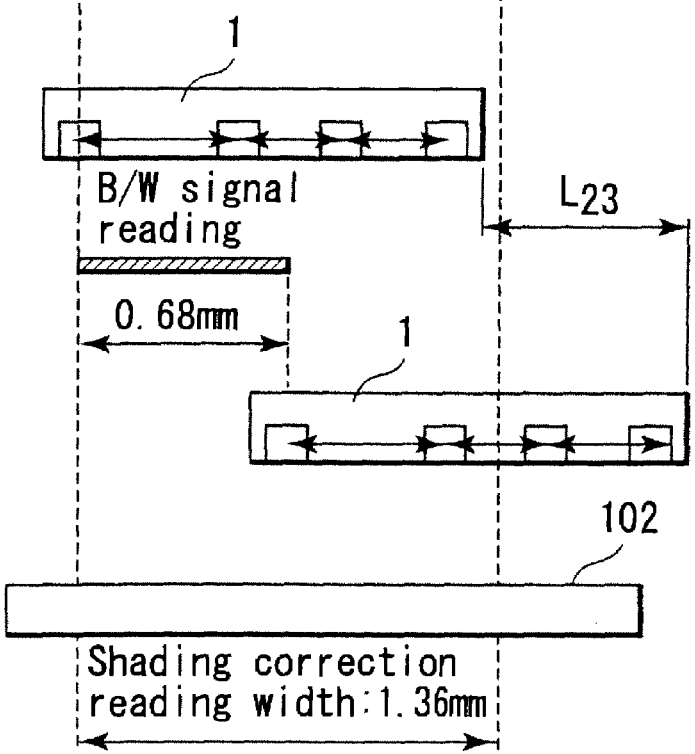

FIG. 8 is a diagram to help explain the third reading method for the shading correction plate 11. In the example of FIG. 8, the scanning positions of the line sensors R, G, B, BW are arranged in the order of R, G, B, BW in the direction in which the first carriage 18 moves (or in the feed direction). In FIG. 8, suppose, in the color reading mode, the control unit 32 takes in the signals (the R signal, G signal, and B signal) from the three line sensors R, G, B at the same time.

In FIG. 8, in the color reading mode, with the scanning position of the blue line sensor B as the reading start position (the trailing edge in the feed direction of the shading correction plate 11), the red line sensor R, green line sensor G, and blue line sensor B each read the shading correction plate 11 by 16 lines at the same time.

Specifically, in the color reading mode, the width in the feed direction of the shading correction plate 11 is equal to the total (1.36 mm) of the width (0.68 mm) required for each of the red line sensor R, green line sensor G, and blue line sensor B to read 16 lines, the spacing (0.34 mm) of 8 lines between the red line sensor R and the green line sensor G, and the spacing (0.34 mm) of 8 lines between the green line sensor G and the blue line sensor B. In addition, when the shading correction plate 11 is read in the color reading mode, the travel distance L13 of the first carriage 18 is equivalent to 16 lines.

In the monochromatic reading mode, with the scanning position of the black-and-white line sensor BW as the reading start position (the trailing edge in the feed direction of the shading correction plate 11), the black-and-white line sensor BW reads the shading correction plate 11 by 16 lines. Specifically, in the monochromatic reading mode, the width in the feed direction needed for the black-and-white line sensor BW to read the shading correction plate 11 by 16 lines is 0.68 mm equivalent to 16 lines (the number of reading lines). In addition, when the shading correction plate 11 is read in the monochromatic reading mode, the travel distance L23 of the first carriage 18 is equivalent to 16 lines.

As described above, in the third reading method, the reading start position of the shading correction plate 11 in the color reading mode and the reading start position of the shading correction plate 11 in the monochromatic reading mode are set separately. The width in the feed direction of the shading correction plate 11 has to be equal to the total (equivalent to 32 lines) of the reading widths (equivalent to 16 lines) of the line sensors R, G, B and the total spacing between the three line sensors (equivalent to 8×2 lines) in the color reading mode. In the monochromatic reading mode, the width has to be the reading width (equivalent to 16 lines) of at least the black-and-white line sensor BW.

Therefore, in the third reading method of FIG. 8, the shading correction plate has only to have a width of 32 lines in the feed direction. Specifically, in the third reading method of FIG. 8, the width in the feed direction of the shading correction plate is the same as in the second reading method of FIG. 7, but the travel distance of the first carriage in reading the shading correction plate can be made smaller. If the travel speed of the first carriage in the third reading method is the same as that in the second reading method, the time required to read the shading correction plate can be made shorter in the third reading method than in the second reading method. Therefore, the time needed to make a shading correction can be made shorter.

Hereinafter, a fourth to a sixth reading method for the shading correction method 11 will be explained.

The fourth to sixth reading methods can be applied to the image reading apparatus 10 where the scanning positions of the line sensors R, G, B, BW are arranged in the order of BW, B, G, R in the direction in which the first carriage 18 moves (or in the feed direction).

First, the fourth reading method for the shading correction plate 11 will be explained.

Figure 9:
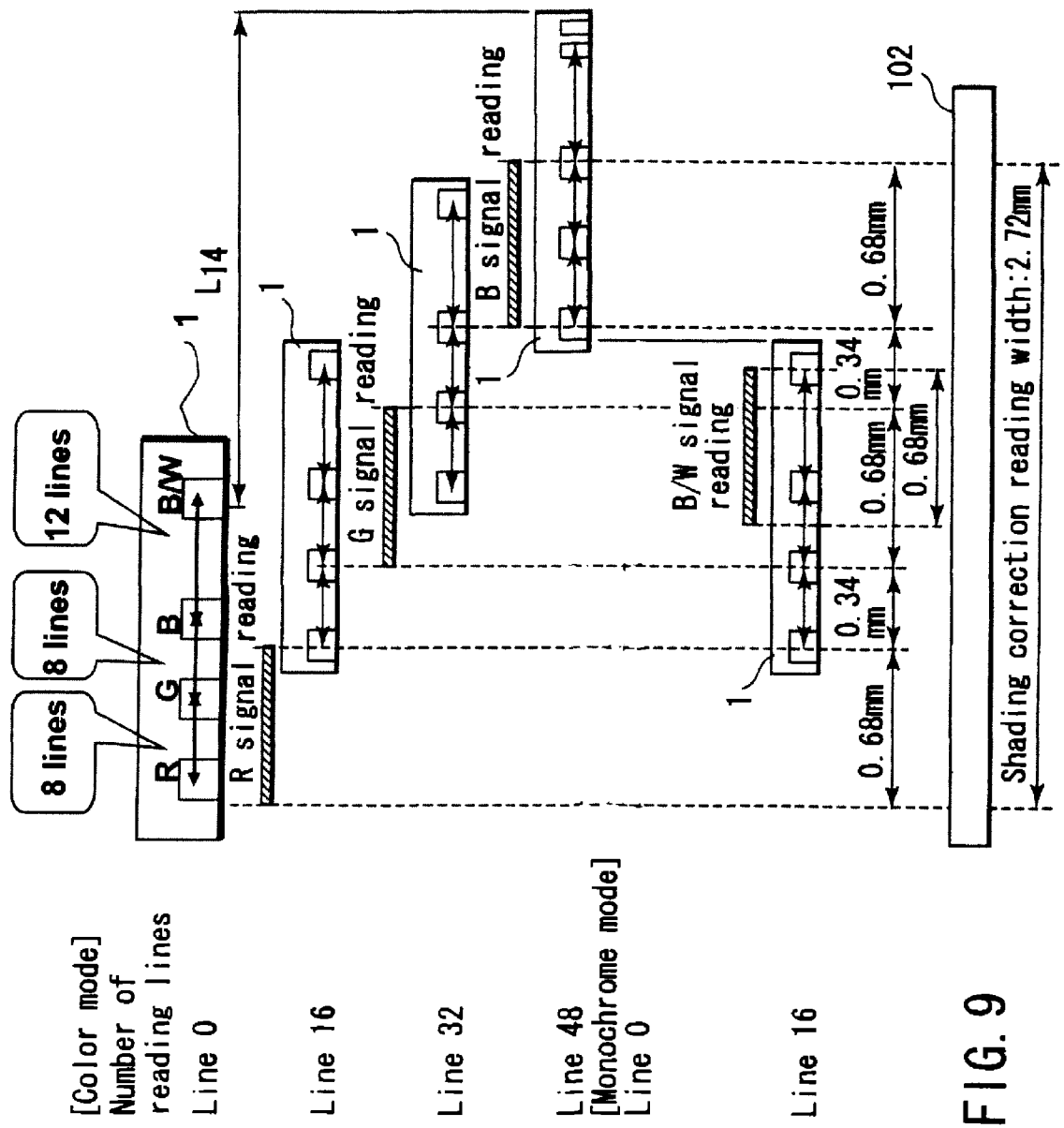
FIG. 9 is a diagram to help explain a shading correction plate reading operation in a fourth reading method.

FIG. 9 is a diagram to help explain the fourth reading method for the shading correction plate 11. In the example of FIG. 9, the scanning positions of the line sensors R, G, B, BW are arranged in the order of BW, B, G, R in the direction in which the first carriage 18 moves (or the feed direction). In FIG. 9, suppose, in the color reading mode, the control unit 32 reads the signals from the three line sensors R, G, B in this order: the R signal, the G signal, and the B signal.

In FIG. 9, in the color reading mode, with the scanning position of the red line sensor R as the reading start position (the trailing edge in the feed direction of the shading correction plate 11), the red line sensor R first reads the shading correction plate 11 by 16 lines. Then, the green line sensor G reads the shading correction plate 11 by 16 lines. Thereafter, the blue line sensor B reads the shading correction plate 11 by 16 lines.

Specifically, in the color reading mode, the width in the feed direction of the shading correction plate 11 is equal to the total (2.72 mm) of the width (0.68 mm) needed for the red line sensor R to read 16 lines, the spacing of 8 lines (0.34 mm) between the red line sensor R and the green line sensor G, the width (0.68 mm) needed for the green line sensor G to read 16 lines, the spacing of 8 lines (0.34 mm) between the green line sensor G and the blue line sensor B, and the width (0.68 mm) needed for the blue line sensor B to read 16 lines. In addition, when the shading correction plate 11 is read in the color reading mode, the travel distance L14 of the first carriage 18 is equivalent to 48 lines (16×3 lines).

In the monochromatic reading mode, with the scanning position of the black-and-white line sensor BW as the reading start position (the trailing edge in the feed direction of the shading correction plate 11), the black-and-white line sensor BW reads the shading correction plate 11 by 16 lines. Specifically, in the monochromatic reading mode, the width in the feed direction needed for the black-and-white line sensor BW to read the shading correction plate 11 by 16 lines is 0.68 mm equivalent to 16 lines (the number of reading lines). In addition, when the shading correction plate 11 is read in the monochromatic reading mode, the travel distance L24 of the first carriage 18 is equivalent to 16 lines.

As described above, in the fourth reading method, the reading start position of the shading correction plate 11 in the color reading mode and the reading start position of the shading correction plate 11 in the monochromatic reading mode are set separately as in the first reading method. The width in the feed direction of the shading correction plate 11 has to be equal to the total (equivalent to 64 lines) of the reading widths (equivalent to 16×3 lines) of at least the three line sensors R, G, and B and the total spacing between the three line sensors (equivalent to 8×2 lines) in the color reading mode. In the monochromatic reading mode, the width has to be the reading width (equivalent to 16 lines) of at least the black-and-white line sensor BW.

Therefore, in the fourth reading method of FIG. 9, the shading correction plate has only to have a width of 64 lines in the feed direction. Specifically, as compared with the reading method of reading the four line sensors R, G, B, BW in the order of R, G, B, BW, in the fourth reading method, the width in the feed direction of the shading correction plate 11 can be decreased by the total of the spacing (12 lines) between the color line sensors (three line sensors R, G, B) and the monochromatic line sensor (black-and-white line sensor BW) and the reading width (equivalent to 16 lines) of the black-and-white line sensor BW. In addition, the travel distance of the first carriage in reading the shading correction plate can be decreased by the travel distance (equivalent to 16 lines) needed for the black-and-white line sensor BW to read. This is the effect obtained because the reading position (the reading start position) of the shading correction plate in the color reading mode and the reading position (the reading start position) of the shading correction plate in the monochromatic reading mode have been set in separate positions.

Next, the fifth reading method for the shading correction plate 11 will be explained.

Figure 10:
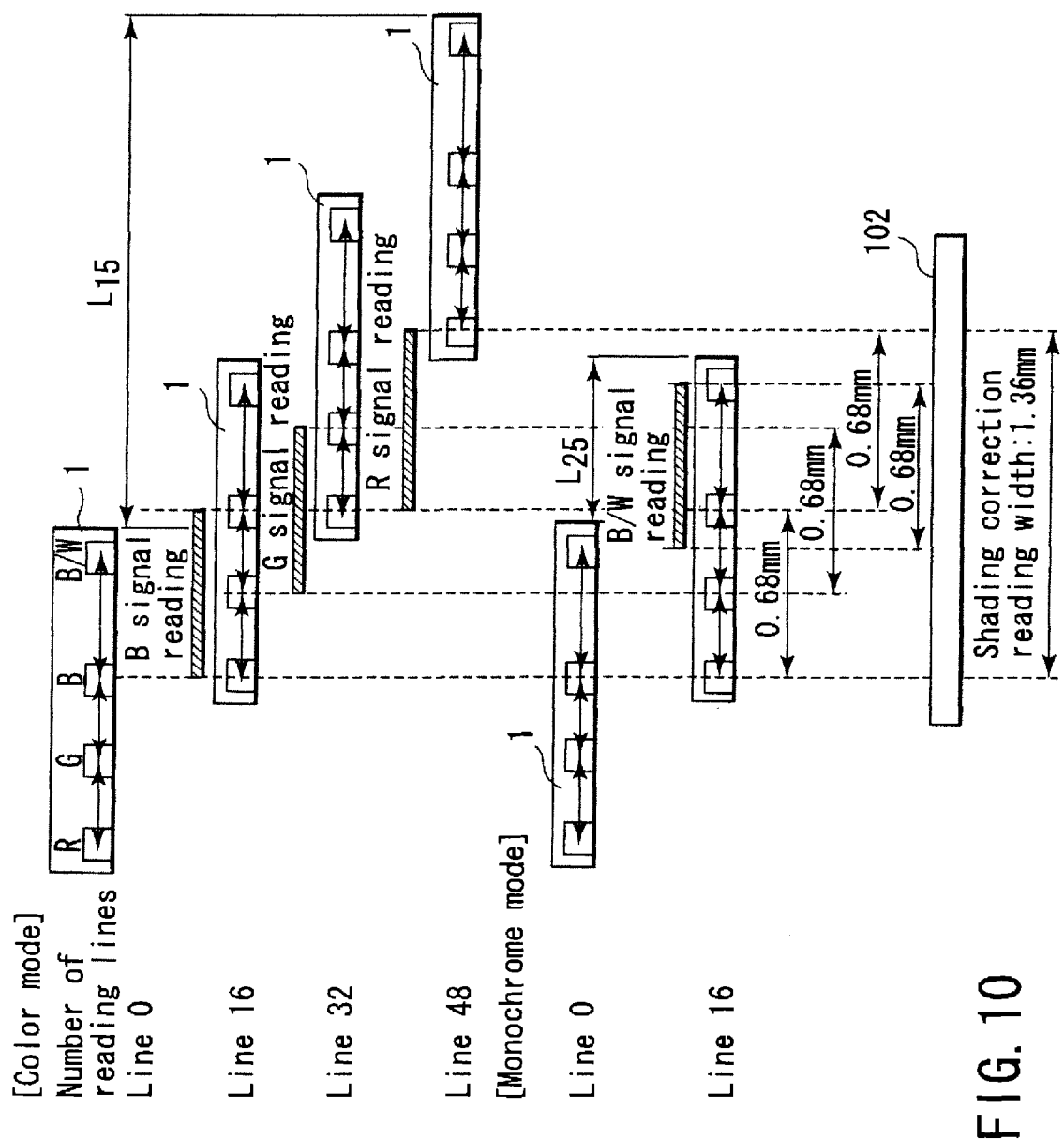
FIG. 10 is a diagram to help explain a shading correction plate reading operation in a fifth reading method.

FIG. 10 is a diagram to help explain the fifth reading method for the shading correction plate 11. In the example of FIG. 10, the scanning positions of the line sensors R, G, B, BW are arranged in the order of BW, B, G, R in the direction in which the first carriage 18 moves (or in the feed direction). In FIG. 10, suppose, in the color reading mode, the control unit 32 reads the signals from the three line sensors R, G, B in this order: the B signal, the G signal, and the R signal.

In FIG. 10, in the color reading mode, with the scanning position of the blue line sensor B as the reading start position (the trailing edge in the feed direction of the shading correction plate 11), the blue line sensor B first reads the shading correction plate 11 by 16 lines. Then, the green line sensor G reads the shading correction plate 11 by 16 lines. Thereafter, the red line sensor R reads the shading correction plate 11 by 16 lines.

Specifically, in the color reading mode, the width in the feed direction of the shading correction plate 11 is equal to the total (1.36 mm) of the width (0.38 mm) obtained by subtracting the spacing of 8 lines (0.34 mm) between the blue line sensor B and the green line sensor G from the width (0.68 mm) needed for the blue line sensor B to read 16 lines, the width (0.38 mm) obtained by subtracting the spacing of 8 lines (0.34 mm) between the green line sensor G and the red line sensor R from the width (0.68 mm) needed for the green line sensor G to read 16 lines, and the width (0.68 mm) needed for the red line sensor R to read 16 lines. In addition, when the shading correction plate 11 is read in the color reading mode, the travel distance L15 of the first carriage 18 is equivalent to 48 lines (16×3 lines) as is the travel distance L14 in the fourth reading method.

In the monochromatic reading mode, with the scanning position of the black-and-white line sensor BW as the reading start position (the trailing edge in the feed direction of the shading correction plate 11), the black-and-white line sensor BW reads the shading correction plate 11 by 16 lines. Specifically, in the monochromatic reading mode, the width in the feed direction needed for the black-and-white line sensor BW to read the shading correction plate 11 by 16 lines is 0.68 mm equivalent to 16 lines (the number of reading lines). In addition, when the shading correction plate 11 is read in the monochromatic reading mode, the travel distance L25 of the first carriage 18 is equivalent to 16 lines as is the travel distance L24 in the fourth reading method.

As described above, in the fifth embodiment, the reading start position of the shading correction plate 11 in the color reading mode and the reading start position of the shading correction plate 11 in the monochromatic reading mode are set separately. The width in the feed direction of the shading correction plate 11 has to be equal to the value (equivalent to 32 lines) obtained by subtracting the total spacing between the three line sensors (equivalent to 8×2 lines) from the reading widths of at least the three line sensors R, G, and B (equivalent to 16×3 lines) in the color reading mode. In the monochromatic reading mode, the width has to be the reading width (equivalent to 16 lines) of at least the black-and-white line sensor BW.

Therefore, in the fifth reading method of FIG. 10, the shading correction plate has only to have a width of 32 lines in the feed direction. Specifically, in the fifth reading method of FIG. 10, the travel distance of the first carriage in reading the shading correction plate is the same as in the fourth reading method of FIG. 9 and the width in the feed direction of the shading correction plate is decreased by twice the total spacing between the three line sensors.

Next, the sixth reading method for the shading correction plate 11 will be explained.

Figure 11:
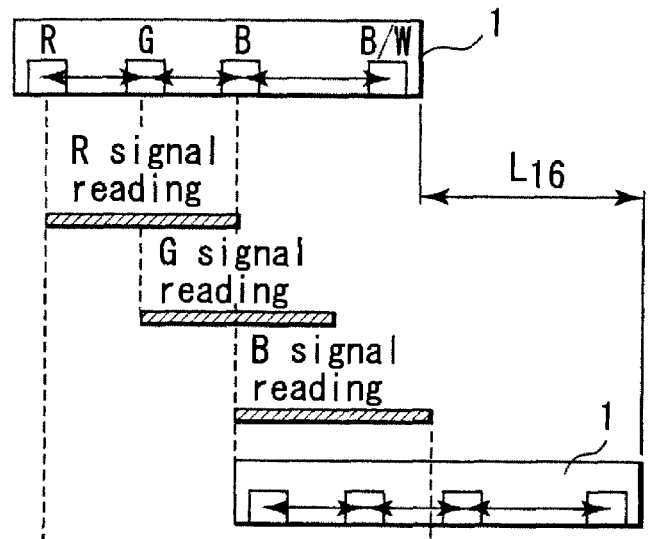
FIG. 11 is a diagram to help explain a shading correction plate reading operation in a sixth reading method.
Figure 11:
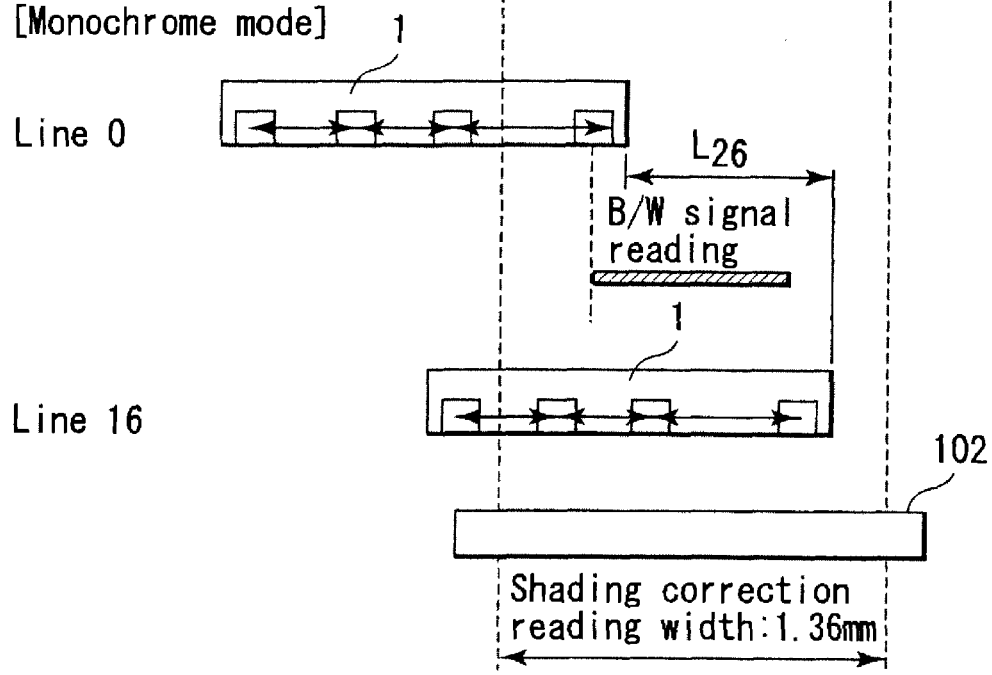

FIG. 11 is a diagram to help explain the sixth reading method for the shading correction plate 11. In the example of FIG. 11, the scanning positions of the line sensors R, G, B, BW are arranged in the order of BW, B, G, R in the direction in which the first carriage 18 moves (or in the feed direction). In FIG. 11, suppose, in the color reading mode, the control unit 32 takes in the signals (the R signal, G signal, and B signal) from the three line sensors R, G, B at the same time.

In FIG. 11, in the color reading mode, with the scanning position of the red line sensor R as the reading start position (the trailing edge in the feed direction of the shading correction plate 11), the red line sensor R, green line sensor G, and blue line sensor B each read the shading correction plate 11 by 16 lines at the same time.

Specifically, in the color reading mode, the width in the feed direction of the shading correction plate 11 is equal to the total (1.36 mm) of the width (0.68 mm) required for each of the red line sensor R, green line sensor G, and blue line sensor B to read 16 lines, the spacing (0.34 mm) of 8 lines between the red line sensor R and the green line sensor G, and the spacing (0.34 mm) of 8 lines between the green line sensor G and the blue line sensor B. In addition, when the shading correction plate 11 is read in the color reading mode, the travel distance L16 of the first carriage 18 is equivalent to 16 lines.

In the monochromatic reading mode, with the scanning position of the black-and-white line sensor BW as the reading start position (the trailing edge in the feed direction of the shading correction plate 11), the black-and-white line sensor BW reads the shading correction plate 11 by 16 lines. Specifically, in the monochromatic reading mode, the width in the feed direction needed for the black-and-white line sensor BW to read the shading correction plate 11 by 16 lines is 0.68 mm equivalent to 16 lines (the number of reading lines). In addition, when the shading correction plate 11 is read in the monochromatic reading mode, the travel distance L26 of the first carriage 18 is equivalent to 16 lines.

As described above, in the sixth reading method, the reading start position of the shading correction plate 11 in the color reading mode and the reading start position of the shading correction plate 11 in the monochromatic reading mode are set separately. The width in the feed direction of the shading correction plate 11 has to be equal to the total (equivalent to 32 lines) of the reading widths (equivalent to 16 lines) of the line sensors R, G, B and the total spacing between the three line sensors (equivalent to 8×2 lines) in the color reading mode. In the monochromatic reading mode, the width has to be the reading width (equivalent to 16 lines) of at least the black-and-white line sensor BW.

Therefore, in the sixth reading method of FIG. 11, the shading correction plate has only to have a width of 32 lines in the feed direction. Specifically, in the sixth reading method of FIG. 11, the width in the feed direction of the shading correction plate is the same as in the fifth reading method of FIG. 10, but the travel distance of the first carriage in reading the shading correction plate can be made smaller. If the travel speed of the first carriage in the sixth reading method is the same as that in the fifth reading method, the time required to read the shading correction plate can be made shorter in the sixth reading method than in the fifth reading method. Therefore, the time needed to make a shading correction can be made shorter.

Next, the difference between the first to sixth reading methods and their applications will be explained.

The first to sixth reading methods are selected suitably according to the specifications of the image reading apparatus, including the arrangement of the scanning positions of the line sensors in the feed direction, the order in which the signals from the sensors are taken in, and the way the signals from the sensors are taken in. This makes it possible to design the best shading correction plate and make the most suitable shading correction according to various types of image reading apparatuses.

The first to third reading methods are applied to, for example, the following image reading apparatuses.

The first reading method can be applied to an image reading apparatus where the arrangement of the scanning positions in the feed direction of the line sensors R, G, B, BW in the 4-line CCD sensor 1 is in the order of R, G, B, BW and the color line sensors R, G, B are designed to read the shading correction plate 11 in this order: B, G, R.

The second reading method can be applied to an image reading apparatus where the arrangement of the scanning positions in the feed direction of the line sensors R, G, B, BW in the 4-line CCD sensor 1 is in the order of R, G, B, BW and the color line sensors R, G, B are designed to read the shading correction plate 11 in this order: R, G, B.

When the arrangement of the scanning positions in the feed direction of the line sensors R, G, B, BW in the 4-line CCD sensor 1 is in the order of R, G, B, BW and the order in which the color line sensors R, G, B reads can be selected, the first or second reading method can be applied. Since the shading correction plate 11 can be made narrower in the second reading method than in the first reading method, it is desirable to apply the second reading method.

The third reading method can be applied to an image reading apparatus where the arrangement of the scanning positions in the feed direction of the line sensors R, G, B, BW in the 4-line CCD sensor 1 is in the order of R, G, B, BW and the color line sensors R, G, B are designed to read the shading correction plate 11 at the same time.

The fourth to sixth reading methods are applied to, for example, the following image reading apparatuses.

The fourth reading method can be applied to an image reading apparatus where the arrangement of the scanning positions in the feed direction of the line sensors R, G, B, BW in the 4-line CCD sensor 1 is in the order of BW, B, G, R and the color line sensors R, G, B are designed to read the shading correction plate 11 in this order: R, G, B.

The fifth reading method can be applied to an image reading apparatus where the arrangement of the scanning positions in the feed direction of the line sensors R, G, B, BW in the 4-line CCD sensor 1 is in the order of BW, B, G, R and the color line sensors R, G, B are designed to read the shading correction plate 11 in this order: B, G, R.

When the arrangement of the scanning positions in the feed direction of the line sensors R, G, B, BW in the 4-line CCD sensor 1 is in the order of BW, B, G, R and the order in which the color line sensors R, G, B reads can be selected, the fourth or fifth reading method can be applied. Since the shading correction plate 11 can be made narrower in the fifth reading method than in the fourth reading method, it is desirable to apply the fifth reading method.

The sixth reading method can be applied to an image reading apparatus where the arrangement of the scanning positions in the feed direction of the line sensors R, G, B, BW in the 4-line CCD sensor 1 is in the order of BW, B, G, R and the color line sensors R, G, B are designed to read the shading correction plate 11 at the same time.

In the embodiment, as explained in the first to sixth reading method, in the image reading apparatus having the color line sensors and the monochromatic line sensor different from the color line sensors, the reading position of the shading correction plate in the color reading mode and the reading position of the shading correction plate in the monochromatic reading mode are set independently. This makes it possible to make narrower the width in the feed direction of the shading correction plate.

From the viewpoint of carriage driving control, when the reading of the shading correction plate is started at the same position in both the color reading mode and the monochromatic reading mode, this makes the driving distance longer in reading the shading correction plate. In contrast, setting the reading start position in the color reading mode and that in the monochromatic reading mode to the optimum positions separately makes it possible to shorten the travel distance in reading the shading correction plate and read the shading correction plate efficiently.

As described above in detail, with the above-described image reading method, the width of the reference plate can be narrower and the shading correction can be made efficiently even in an image reading apparatus which reads images with a line sensor having color line sensors and a monochromatic line sensor. Consequently, use of the image reading method enables the image reading apparatus to be made smaller and more stable.

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image reading apparatus comprising:
   a scanner which relatively exposes a document, and which receives and outputs light beams reflected from the document;
   a reader which comprises a plurality of color line sensors for reading a color image and having a plurality of reading elements aligned in a first direction, and a line sensor for reading a monochromatic image, the reader receiving the light beams output from the scanner;
   a driving motor which moves the scanner in a second direction orthogonal to the first direction;
   a reference member which is arranged in front of a leading edge of a reading face of the document, in the second direction; and
   a controller which corrects image data on the document on the basis of data obtained by reading the reference member using the plurality of color line sensors,
   wherein a region in which the line sensor reads the reference member is in a region in which the plurality of color line sensors read the reference member.

2. The apparatus according to claim 1, wherein the line sensor which reads a monochromatic image makes two outputs, and the two outputs are replaced with any two of the plurality of color line sensors and input to the controller.

3. The apparatus according to claim 2, wherein a position at which one of the color line sensors starts reading the reference member is the same as a position at which the line sensor starts reading the reference member.

4. The apparatus according to claim 2, wherein intervals in the plurality of color line sensors in the second direction are equal to each other.

5. The apparatus according to claim 2, wherein an interval between the line sensor and the plurality of color line sensors is wider than the intervals in the plurality of color line sensors in the second direction.

6. The apparatus according to claim 2, wherein
   each color line sensor is composed of a plurality of line sensors whose scanning positions are arranged at specific intervals in the feed direction, and
   the controller causes any one of color line sensors to start to read the reference member in turn after the scanning position of the line sensor whose scanning position is at the rear in the color line sensor in the feed direction reaches the predetermined reading start position for the reference member.

7. The apparatus according to claim 2, wherein
   each color line sensor is composed of a plurality of line sensors whose scanning positions are arranged at specific intervals in the feed direction, and
   the controller causes any one of the color line sensors to start to read the reference member at the same time at the time when the scanning position of the line sensors whose scanning position is at the rear in the color line sensor in the feed direction reaches the predetermined reading start position for the reference member.

8. The apparatus according to claim 1, wherein intervals in the plurality of color line sensors in the second direction are equal to each other.

9. The apparatus according to claim 8, wherein an interval between the line sensor and the plurality of color line sensors is wider than the intervals in the plurality of color line sensors in the second direction.

10. The apparatus according to claim 1, wherein
    each color line sensor is composed of a plurality of line sensors whose scanning positions are arranged at specific intervals in the feed direction, and
    the controller causes any one of color line sensors to start to read the reference member in turn after the scanning position of the line sensor whose scanning position is at the rear in the color line sensor in the feed direction reaches the predetermined reading start position for the reference plate.

11. The apparatus according to claim 1, wherein
    each color line sensor is composed of a plurality of line sensors whose scanning positions are arranged at specific intervals in the feed direction, and
    the controller causes any one of the color line sensors to start to read the reference member at the same time at the time when the scanning position of the line sensors whose scanning position is at the rear in the color line sensor in the feed direction reaches the predetermined reading start position for the reference member.

12. A method of reading an image, comprising:
    relatively exposing, by a scanner, a document, and receiving and outputting light beams reflected from the document;
    reading, by a plurality of color line sensors of a reader and a plurality of reading elements of the reader aligned in a first direction, a color image based on the light beams output from the scanner, the scanner being driven in a second direction orthogonal to the first direction;
    reading, by a line sensor of the reader, a monochromatic image based on the light beams output from the scanner; and
    correcting, by a controller, image data on the document on the basis of data obtained by reading a reference member using the plurality of color sensors, the reference member arranged in front of a leading edge of a reading face of the document in the second direction, wherein a region in which the line sensor reads the reference member is in a region in which the plurality of color line sensors read the reference member.

13. The method according to claim 12, wherein the line sensor which reads a monochromatic image makes two outputs, the method further comprising:

replacing the two outputs with any two of the plurality of color line sensors and input to the controller.

14. The method according to claim 13, wherein a position at which one of the color line sensors starts reading the reference member is the same as a position at which the line sensor starts reading the reference member.

15. The method according to claim 13, wherein intervals in the plurality of color line sensors in the second direction are equal to each other.

16. The method according to claim 13, wherein an interval between the line sensor and the plurality of color line sensors is wider than the intervals in the plurality of color line sensors in the second direction.

17. The method according to claim 13, wherein each color line sensor is composed of a plurality of line sensors whose scanning positions are arranged at specific intervals in the feed direction, the method further comprising:

causing, by the controller, any one of color line sensors to start to read the reference member in turn after the scanning position of the line sensor whose scanning position is at the rear in the color line sensor in the feed direction reaches the predetermined reading start position for the reference member.

18. The method according to claim 13, wherein each color line sensor is composed of a plurality of line sensors whose scanning positions are arranged at specific intervals in the feed direction, the method further comprising:

causing, by the controller, any one of the color line sensors to start to read the reference member at the same time at the time when the scanning position of the line sensors whose scanning position is at the rear in the color line sensor in the feed direction reaches the predetermined reading start position for the reference member.

19. The method according to claim 12, wherein intervals in the plurality of color line sensors in the second direction are equal to each other.

20. The method according to claim 19, wherein an interval between the line sensor and the plurality of color line sensors is wider than the intervals in the plurality of color line sensors in the second direction.

21. The method according to claim 12, wherein each color line sensor is composed of a plurality of line sensors whose scanning positions are arranged at specific intervals in the feed direction, the method further comprising:

causing, by the controller, any one of color line sensors to start to read the reference member in turn after the scanning position of the line sensor whose scanning position is at the rear in the color line sensor in the feed direction reaches the predetermined reading start position for the reference member.

22. The method according to claim 12, wherein each color line sensor is composed of a plurality of line sensors whose scanning positions are arranged at specific intervals in the feed direction, the method further comprising:

causing, by the controller, any one of the color line sensors to start to read the reference member at the same time at the time when the scanning position of the line sensors whose scanning position is at the rear in the color line sensor in the feed direction reaches the predetermined reading start position for the reference member.

* * * * *